US008180285B2

(12) United States Patent
Rofougaran

(10) Patent No.: US 8,180,285 B2
(45) Date of Patent: May 15, 2012

(54) MILLIMETER WAVE NEAR FIELD COMMUNICATION DEVICE

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 824 days.

(21) Appl. No.: 12/201,020

(22) Filed: Aug. 29, 2008

(65) Prior Publication Data

US 2008/0318524 A1 Dec. 25, 2008

Related U.S. Application Data

(63) Continuation-in-part of application No. 11/648,826, filed on Dec. 29, 2006, now Pat. No. 7,893,878, and a continuation-in-part of application No. 11/372,560, filed on Mar. 10, 2006, now Pat. No. 7,714,780.

(51) Int. Cl.
*H04B 5/00* (2006.01)

(52) U.S. Cl. .................... 455/41.1; 455/101; 455/552.1; 375/295

(58) Field of Classification Search ................. 455/41.1, 455/41.2, 41.3, 42, 43, 63.4, 101, 73, 127.4, 455/552.1, 553.1; 375/295, 316; 340/10.1, 340/10.2, 10.3, 572.1
See application file for complete search history.

(56) References Cited

U.S. PATENT DOCUMENTS 7,576,657 B2 * 8/2009 Duron et al. ............... 340/572.7
7,612,674 B2 * 11/2009 Shintani ..................... 340/572.2
2009/0280750 A1 * 11/2009 Rofougaran et al. ........... 455/73

FOREIGN PATENT DOCUMENTS

CN 1777992 A 5/2006

OTHER PUBLICATIONS

Jihoon Choi and Robert W. Heath, Jr.,Interpolation Based Transmit Beamforming for MIMO-OFDM with Partial Feedback,Univ. of Texas at Austin, Dept. of Electrical & Computer Engineering, Wireless Networking & Comm. Group.

Clint Schreiner, “Utilizing Digital Downconverters for Efficient Digital Beamforming”, Red River Engineering.

Steyskal,Hans, “Digital Beamforming Basics (Antennas)”, Journal of Electronics Defense, Jul. 1, 1996.

* cited by examiner

*Primary Examiner* — Ping Hsieh
(74) *Attorney, Agent, or Firm* — Garlick Harrison & Markison; Timothy W. Markison; Jessica W. Smith

(57) ABSTRACT

A device includes a processing module, a millimeter wave (MMW) oscillation module, a MMW beamforming module, and a plurality of amplifiers. The processing module determines activation of the device and thereafter modulates data to produce modulated data, determines a beamforming setting, and establishes a transmit power setting. The MMW oscillation module generates a modulated MMW signal based on the modulated data. The MMW beamforming module converts the modulated MMW signal into a plurality of MMW beamformed signals based on the beamforming setting. The plurality of amplifiers amplifies the plurality of MMW beamformed signals in accordance with the transmit power setting to produce a MMW near field transmission.

13 Claims, 10 Drawing Sheets

MILLIMETER WAVE NEAR FIELD COMMUNICATION DEVICE

This patent application is claiming priority under 35 USC §120 as a continuation in part patent application of co-pending patent application entitled INTEGRATED CIRCUIT ANTENNA STRUCTURE, having a filing date of Dec. 29, 2006, and a Ser. No. 11/648,826 and is a continuation in part patent application of co-pending patent application entitled BEAMFORMING RF CIRCUIT AND APPLICATIONS THEREOF, having a filing date of Mar. 10, 2006, and a Ser. No. 11/372,560.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to devices used within such systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g compliant or RFID standard compliant employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beamforming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. Prior art papers (1) Digital beamforming basics (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003 discuss beamforming concepts.

In a known beamforming transmitter embodiment, the beamforming transmitter includes the data modulation stage, one or more intermediate frequency (IF) stages, the power amplifier, and a plurality of phase modules. The data modulation stage, the one or more IF stages and the power amplifier operate as discussed above to produce an amplified outbound RF signal. The plurality of phase modules adjust the phase of the amplified outbound RF signal in accordance with a beamforming matrix to produce a plurality of signals that are subsequently transmitted by a set of antennas.

While such a beamforming transmitter provides a functioning transmitter, it requires multiple high frequency, and thus accurate, phase modules and since the phase modules are adjusting the same signal, the resulting magnitude of the phase adjusted signals is the same. Note that gain adjust modules may be added in series with the phase modules, but further adds to the complexity and component count of the beamforming transmitter.

Further improvements in wireless communications involves near field communication (NFC). In a near field communication, the distance between the transmitter and receiver is very short (e.g., less than 10 centimeters) and are used to exchange secure data (e.g., credit card information, medical data, financial data, confidential information, etc.). Such communications incorporate magnetic coupling from the transmitter to the receiver to minimize eavesdropping. Typically, an RF signal has a large radiation pattern that if, incorporated in an NFC application, may be eavesdropped, subjecting the sensitive information to pirating. However, short range RF transmissions exhibit higher data rates and lower transmit power than a comparable magnetic coupling transmission.

Therefore, a need exists for an RF and/or millimeter wave (MMW) NFC device that substantially overcomes one or more of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
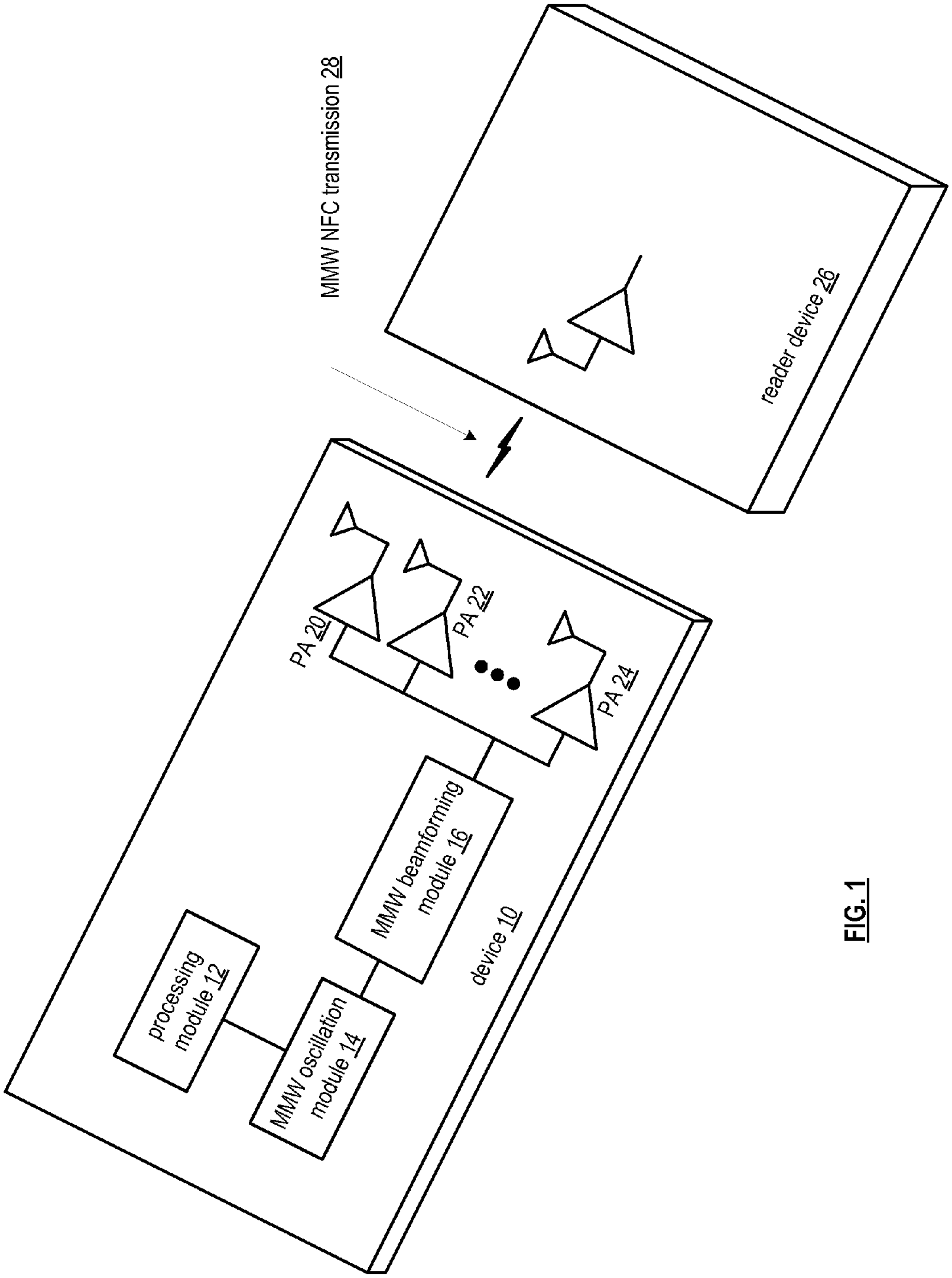
FIG. 1 is a diagram of an embodiment of a millimeter wave (MMW) near field communication (NFC) device in accordance with the present invention.

FIG. 1 is a diagram of an embodiment of a millimeter wave (MMW) near field communication (NFC) device 10 providing information to a reader device 26 via an MMW NFC transmission 28. The device 10 may be a smart card, a credit card, a security token, an access badge, a cellular telephone, and/or any other device that communicates secure data with a reader device 26 (e.g., a point of sale device, a scanner, another MMW NFC device, etc.).

The device 10 includes a substrate which supports a processing module 12, an MMW oscillation module 14, an MMW beamforming module 16, a plurality of amplifiers (PA) 20-24 and a plurality of antennas. The substrate may include one or more of a printed circuit board (PCB), an integrated circuit (IC) package substrate, and an IC die. For example, the processing module 12, the MMW oscillation module 14, the MMW beamforming module 15, and the plurality of amplifiers 20-24 may be implemented on one or more ICs while the antennas are on a PCB, which also supports the one or more ICs. Alternatively, the processing module 12, the MMW oscillation module 14, the MMW beamforming module 15, and the plurality of amplifiers 20-24 may be implemented on one or more dies of an IC while the antennas are on an IC substrate, which also supports the one or more dies.

The processing module 12 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 12 may have an associated memory and/or memory element (not shown), which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module 12 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-12.

Figure 2:
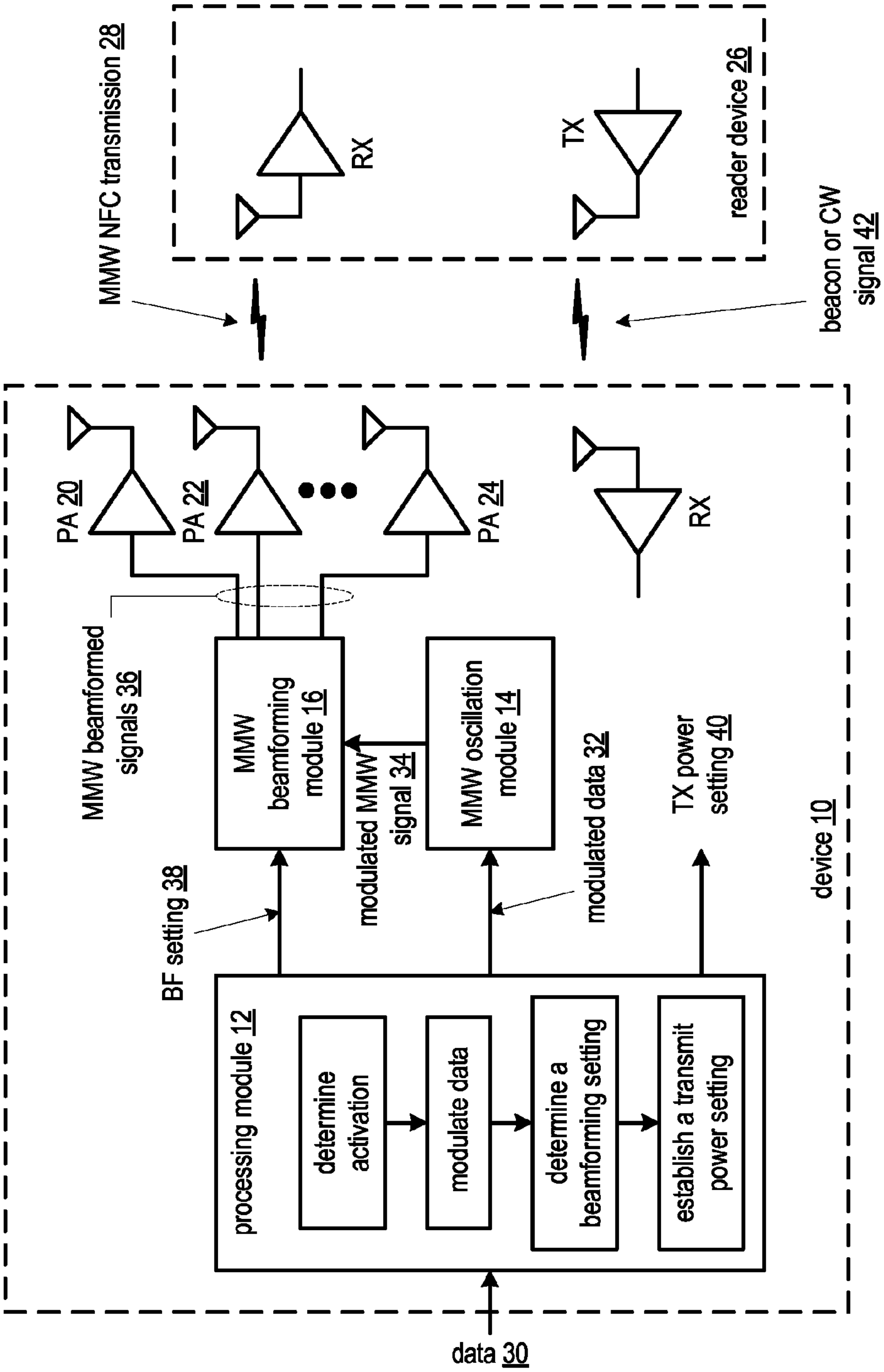
FIG. 2 is a schematic block diagram of an embodiment of a millimeter wave (MMW) near field communication (NFC) device in accordance with the present invention.

FIG. 2 is a schematic block diagram of an embodiment of a millimeter wave (MMW) near field communication (NFC) device 10 that include the processing module 12, the MMW oscillation module 14, the MMW beamforming module 16, the plurality of amplifiers 20-24, and a plurality of antennas. The device 10 may further include a receiver section (RX) that is couple to one or more antennas. The reader device 26 includes a receiver section (RX) that includes at least one antenna and may further include a transmitter section (TX) having at least one transmit antenna. Note that, in the alternative, the antennas in the device 10 may be shared between the receive section (RX) and the plurality of amplifiers 20-24. Similarly, the antennas in the reader device 26 may be shared between the receiver section (RX) and the transmitter section (TX).

In operation, the processing module 12 determines activation of the device 10. This may be done in a variety of ways. For example, the device may receive, via the receiver section (RX) a beacon signal 42 from the reader device 26. The beacon signal 42 may be formatted in accordance with one or more of a variety of standards (e.g., radio frequency identification (RFID), wireless local area network (WLAN), Bluetooth, Zigbee, ECMA-340, ISO/IEC 18092, GSM Mobile NFC initiative, GSM Pay buy mobile initiative, StoLPaN ('Store Logistics and Payment with NFC'), etc.). The receiver section converts the beacon signal, which has a carrier frequency in the millimeter wave range (e.g., in the frequency range of 3 GHz to 300 GHz), into a baseband signal. The processing module 12 interprets the baseband beacon signal to recognize that the device 10 is proximally located to the reader device 26.

As another example, the receiver section of the device 10 may receive a continuous wave (CW) signal 42 from the reader device 26. If the device 10 is passive (i.e., includes no battery or other power source), the receiver section processes the CW signal 42 to generate a supply voltage for the remainder of the device 10. The processing module 12 determines activation of the device 10 upon receipt of the power. If the device is active, the receiver section may include a received signal strength indicator to measure the received signal strength of the CW signal 42. The processing module 12 interprets the received signal strength indication to determine whether the device is active (e.g., above a certain threshold, the device should be activated).

In yet another example, the device 10 may include capacitive sensors and motion detection circuitry. The capacitive sensors determine whether a human hand is touching the device 10. The motion detection circuitry (e.g., accelerometer, a gyroscope, etc.) determines motion of the device 10. As such, if the device is in a human hand and being moved in a particular manner, it is assumed that it is to be used and thus activated.

After determining activation of the device 10, the processing module modulates data 30 (e.g., secure data such as credit card information, medical information, personal information, and/or any other information desired to be held in confidence) to produce modulated data 32. The processing module 12 may use any of a plurality of modulation techniques to modulate the data 30. For example, the processing module may be use any form of frequency shift keying (FSK), minimum shift keying (MSK), phase shift keying (PSK) modulator, and/or amplitude shift keying (ASK).

The processing module 12 then determines a beamforming (BF) setting 38 for the device 10. In general, the beamforming setting 38 is selected such that there is little or negligible radiation pattern outside of a direct path between the device 10 and the reader device 26 making eavesdropping virtually impossible. In an embodiment, the processing module 12 may determine the beamforming setting 38 by determining orientation of the device 10 with respect to a reader device (e.g., identifying the direct path between the two devices). The processing module 12 then establishing the beamforming setting 38 based on the orientation to provide a controlled radiation pattern between the device 10 and the reader device 26. An example of determining the orientation is provided with reference to FIG. 3. Alternatively, the orientation may be determined based on guides on the reader device 26. As yet another alternative, the orientation may be determined by on how the device 10 is being held and it motion.

The processing module 12 continues by establishing a transmit power setting 40. In general, the transmit power setting 40 is set that the MMW NFC transmission 28 has a range of a few centimeters or less. The power setting 40 may be uniformly applied to each amplifier 20-24 or individually determined for each amplifier 20-24. For instance, if the device 10 is at an angle with respect to the reader device 26 such that some of the antennas 20-24 are further away for the receive antenna of the reader device than others, then each antenna may have its own power setting established such that the receiver section of the reader device receives the transmissions from the antenna 20-24 at a substantially equal level. In an embodiment, the processing module 12 may determine the power setting 40 by determining orientation of the device 10 with respect to the reader device 26 and then determining the transmit power level for each of the plurality of amplifiers based on the orientation.

The millimeter wave (MMW) oscillation module 14 (embodiments of which will be described in greater detail with reference to FIGS. 6, 8, and 12) generates a modulated MMW signal 34 based on the modulated data 32. The MMW beamforming module 16 (embodiments of which will be described in greater detail with reference to FIGS. 7 and 8) converts the modulated MMW signal 34 into a plurality of MMW beamformed signals 36 based on the beamforming setting 38. The plurality of amplifiers 20-24 amplify the plurality of MMW beamformed signals 36 in accordance with the transmit power setting 40 to produce a MMW near field transmission 28.

Figure 4:
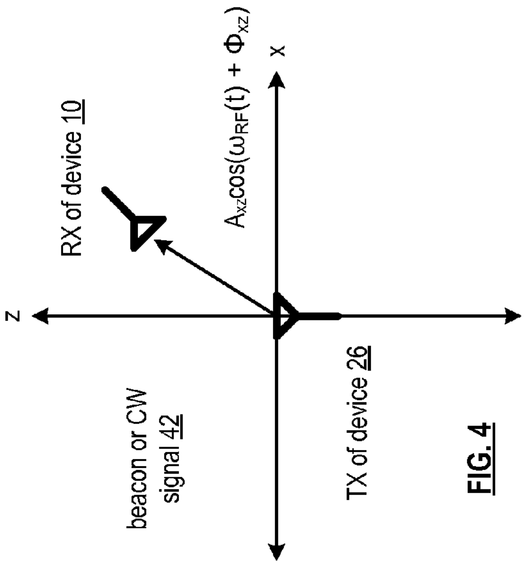
FIGS. 3-5 are diagrams of an example of determining orientation of the MMW NFC device with respect to a reader device in accordance with the present invention.
Figure 5:
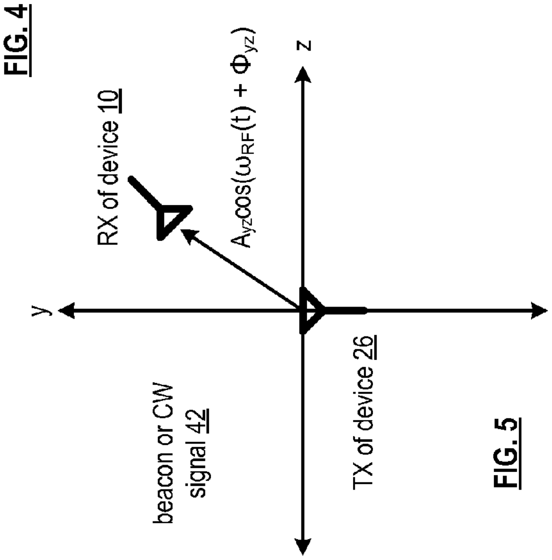
Figure 3:
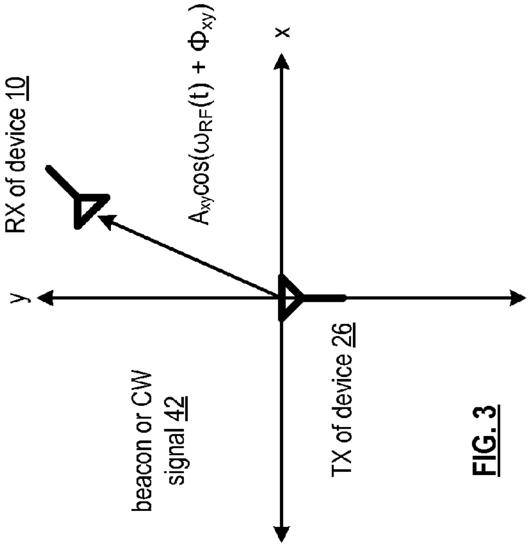

FIGS. 3-5 are diagrams of an example of determining orientation of the MMW NFC device 10 with respect to a reader device 26. In the example of these figures, the reader device 26 transmits a beacon signal (e.g., $A_0 \cos(\omega_{RF}(t)+\Phi(t))$, where A is the amplitude and $\Phi(t)$ represents the phase and/or frequency modulation of the data) via its transmitter section (TX) that is received by the receive section (RX) of the device 10. In this example, the receiver section of the device 10 includes a plurality of antennas, such that, in XYZ space the orientation of the beacon signal 42 can be determined. For instance, in x-y space, the beacon signal 42 includes an xy component (e.g., e.g., $A_{xy} \cos(\omega_{RF}(t)+\Phi_{xy}(t))$), a yz component (e.g., e.g., $A_{yz} \cos(\omega_{RF}(t)+\Phi_{yz}(t))$), and an xz component (e.g., e.g., $A_{xz} \cos(\omega_{RF}(t)+\Phi_{xz}(t))$).

Figure 6:
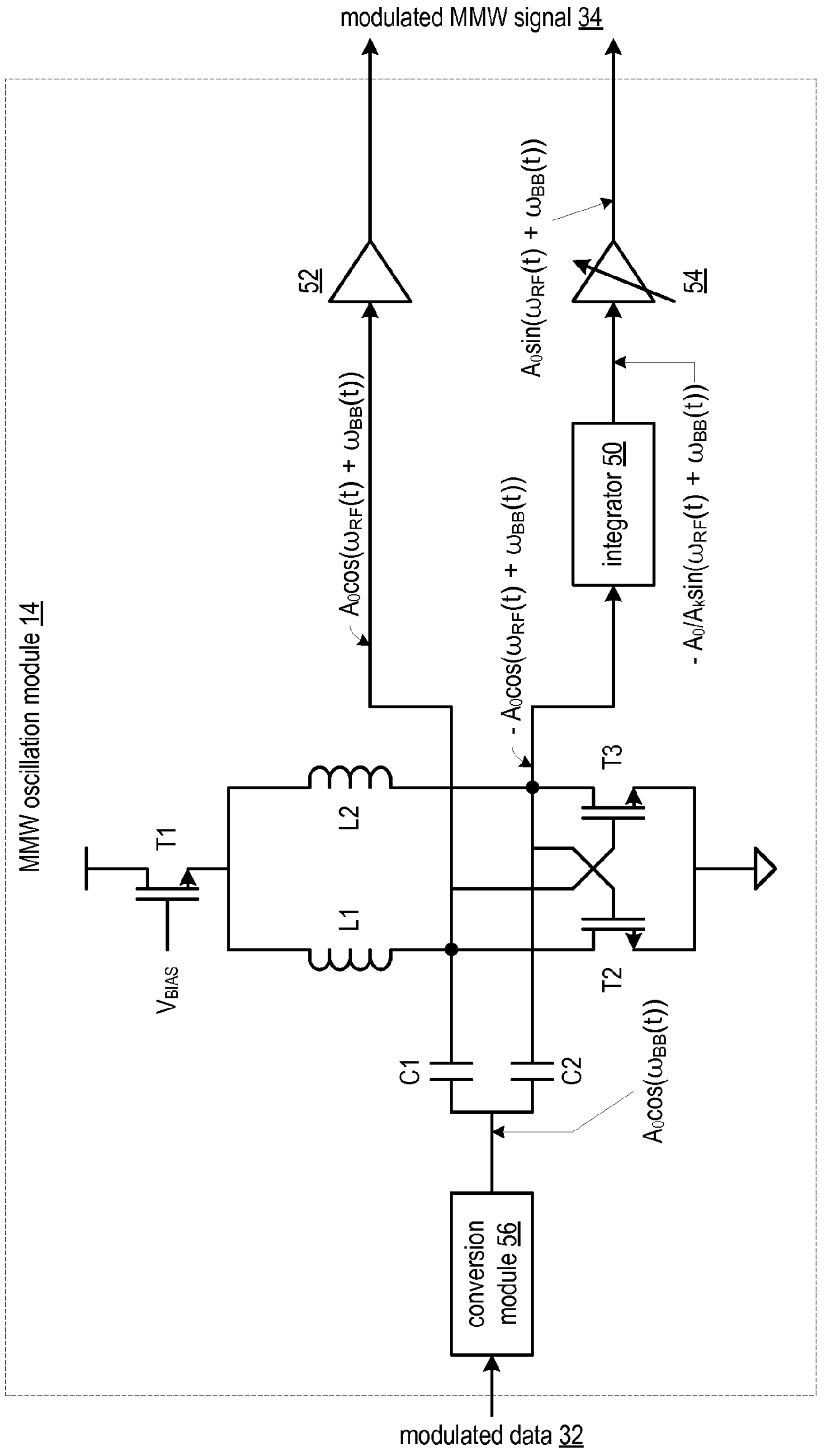
FIG. 6 is a schematic block diagram of an embodiment of a millimeter wave (MMW) oscillation module in accordance with the present invention.

FIG. 6 is a schematic block diagram of an embodiment of a millimeter wave (MMW) oscillation module 14 that includes a conversion module 56, a voltage controlled oscillator, and an integrator 50. The voltage controlled oscillator includes transistors T1-T3, capacitors C1 and C2, and inductors L1 and L2. The MMW oscillation module 14 may further includes a buffer 52 and an adjustable gain module 54. The conversion module 56, which may be a digital to analog conversion module, convert the modulated data 32 into a modulated control voltage (e.g., $A_0 \cos(\omega_{BB}(t))$, where $\omega_{BB}(t)$ represents the modulated data).

The inductors L1 and L2 and capacitors C1 and C2 of the voltage controlled oscillator are selected to resonate at the desired MMW frequency (e.g., in the range of 3 GHz to 300 GHz). Note that the voltage controlled oscillator may generate a lower frequency range oscillation (e.g., in the range of 100 MHz to 3 GHz). For the purposes of this application, the MMW signals 34 may be in frequency range of 100 MHz to 300 GHz. The cross coupled transistors T2 and T3 transition between various stages of on and off to produce a differential sinusoidal signal having a non-inverted oscillation component and an inverted oscillation component (e.g., $A_0 \cos(\omega_{RF}(t)+\omega_{BB}(t))$ and $-A_0 \cos(\omega_{RF}(t)+\omega_{BB}(t))$, where $\omega_{RF}(t)$ represents the MMW frequency component of the signal).

The integrator 50 integrates one of the non-inverted oscillation component and the inverted oscillation component to produce a quadrature oscillation component (e.g., $-A_0/A_k \sin(\omega_{RF}(t)+\omega_{BB}(t))$, where Ak represents the constant portion that results from integrated a cosine waveform). The adjustable gain module 54 compensates for the $-1/A_k$ constant component, outputting a quadrature oscillation component (e.g., $A_0 \sin(\omega_{RF}(t)+\omega_{BB}(t))$) with respect to the non-inverting oscillation component. The modulated MMW signal 34 includes the quadrature oscillation component and the non-inverting oscillation component.

Figure 7:
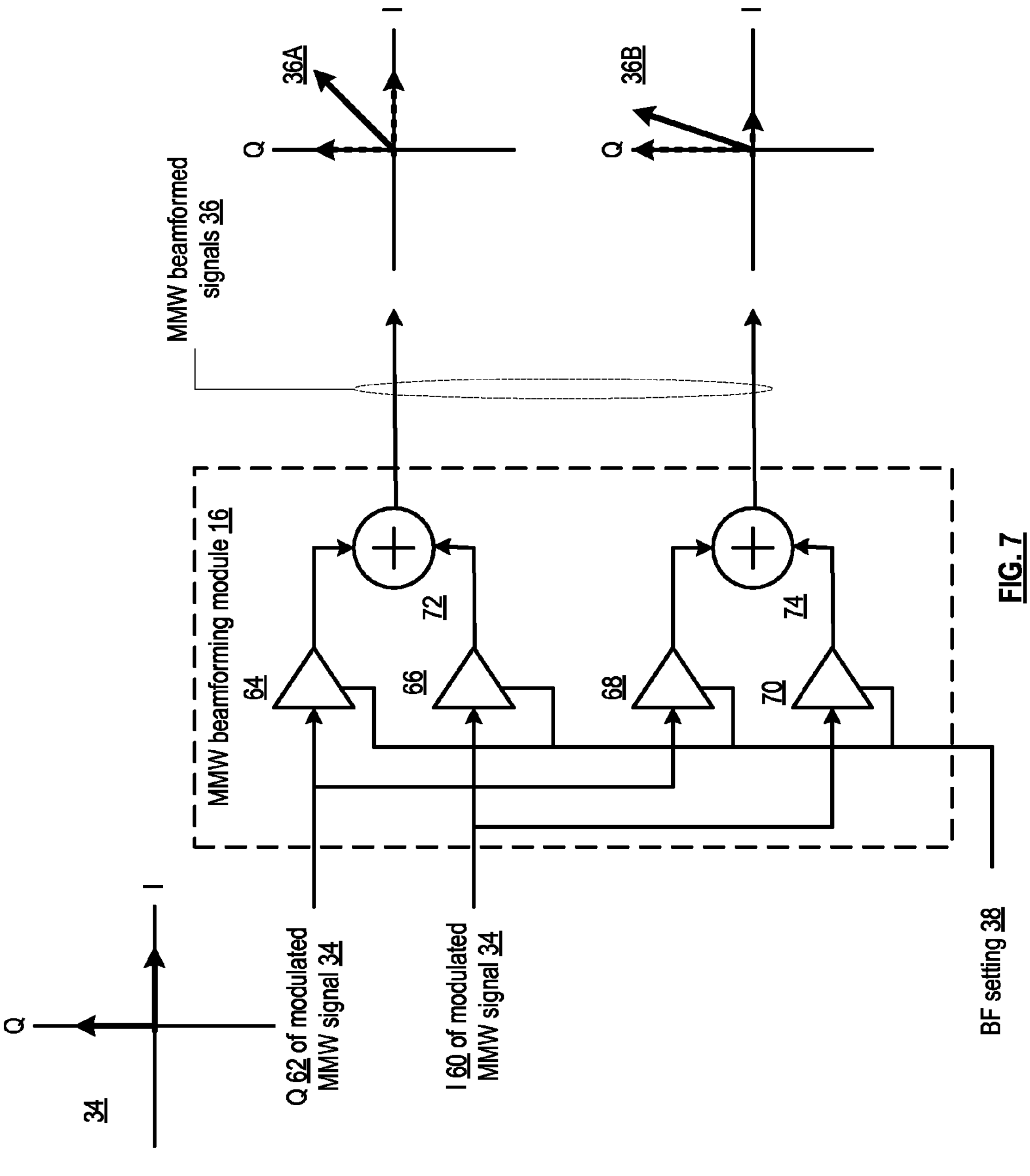
FIG. 7 is a schematic block diagram of an embodiment of a millimeter wave (MMW) beamforming module in accordance with the present invention.

FIG. 7 is a schematic block diagram of an embodiment of a millimeter wave (MMW) beamforming module 16 that includes a plurality of phase adjust modules. Each phase adjust module includes a first adjustable gain module 64 or 68, a second adjustable gain module 66 or 70, and a summing module 72 or 72. Note that the MMW beamforming module 16 may have many more than two phase adjust modules depending on the desired number of beamformed signals.

The first adjustable gain module 64 or 68 adjusts gain of the quadrature oscillation component 62 of the modulated MMW signal 34 based on an element of the beamforming setting 38 to produce a first adjusted oscillation. The second adjustable gain module 66 or 70 adjusts gain of the non-inverted (e.g., in-phase) oscillation component 60 of the modulated MMW signal 34 based on the element of the beamforming setting 38 to produce a second adjusted oscillation. The summing module 72 or 74 sums the first and second adjusted oscillations to produce one of the plurality of MMW beamformed signals 36. In this example, the processing module 12 generates beamforming coefficients for each pair of gain modules in each phase adjust module.

As an example, if the beamforming setting for the first and second adjust modules 64 and 66 are equal, the resulting first and second adjusted oscillations will have the same amplitude. In this instance, the summing module 72 produces an MMW beamformed signal 36 that has a phase shift of 45° and an amplitude corresponding to the vector summation of the amplitudes of the in-phase component 60 and the quadrature component 62. This is shown as the polar coordinate plot of the MMW beamformed signal 36A.

Continuing with the example, if the gain modules 68 and 70 have different beamforming settings, the resulting first and second adjusted signals will have different amplitudes. In this instance, if gain module 70 reduces the magnitude of the in-phase component 60 while gain module 68 increases the magnitude of the quadrature component 62, the resulting MMW beamformed signal 36B will have a polar coordinate plot similar to that illustrated in the present figure. Further, note that the gain modules may include an inversion stage such that 180° phase shifted representation of the in-phase or quadrature signal component may be summed to produce any desired phase angle shift in the corresponding MMW beamformed signal 36. Alternatively, summing module 72 and/or 74 may be subtraction modules such that the in-phase component is subtracted from the quadrature component or vice versa to achieve a different phase of the resulting MMW beamformed signal 36.

Figure 8:
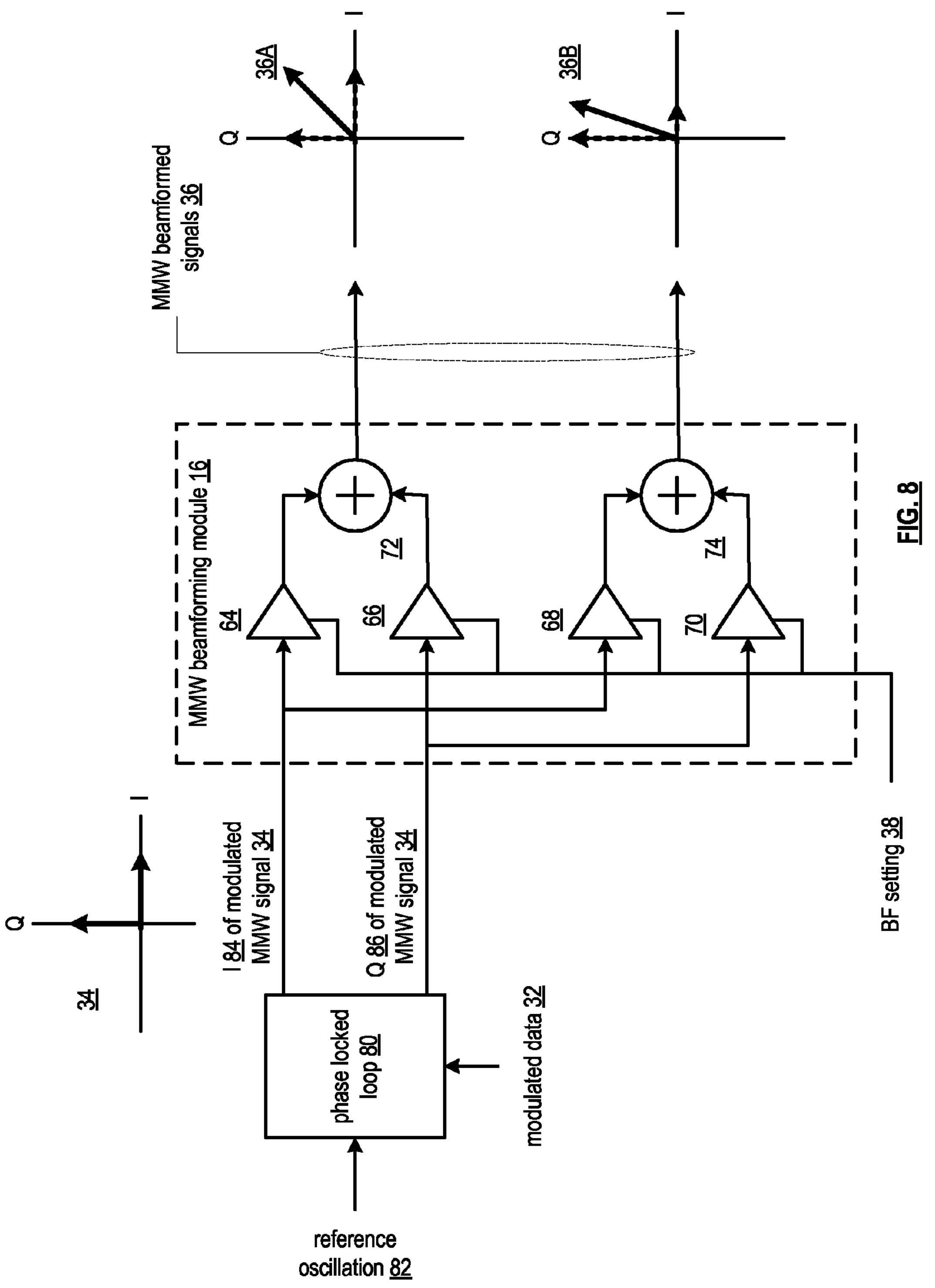
FIG. 8 is a schematic block diagram of another embodiment of a millimeter wave (MMW) oscillation module and a MMW beamforming module in accordance with the present invention.

FIG. 8 is a schematic block diagram of another embodiment of a millimeter wave (MMW) oscillation module 14 and a MMW beamforming module 16. The MMW oscillation module 14 includes a phase locked loop. The phase locked loop generates an in-phase oscillation component 84 and a quadrature oscillation component 86 based on a reference oscillation 82 (e.g., a crystal oscillator) and the modulated data 32 (e.g., injected into the feedback path via a sigma delta modulator or other known technique). The MMW beamforming module 16 processes the I and Q oscillation components 84 and 86 as previously described with respect to the I and Q oscillation components 60 and 62 of FIG. 7 to produce the MMW beamformed signals 36.

Figure 9:
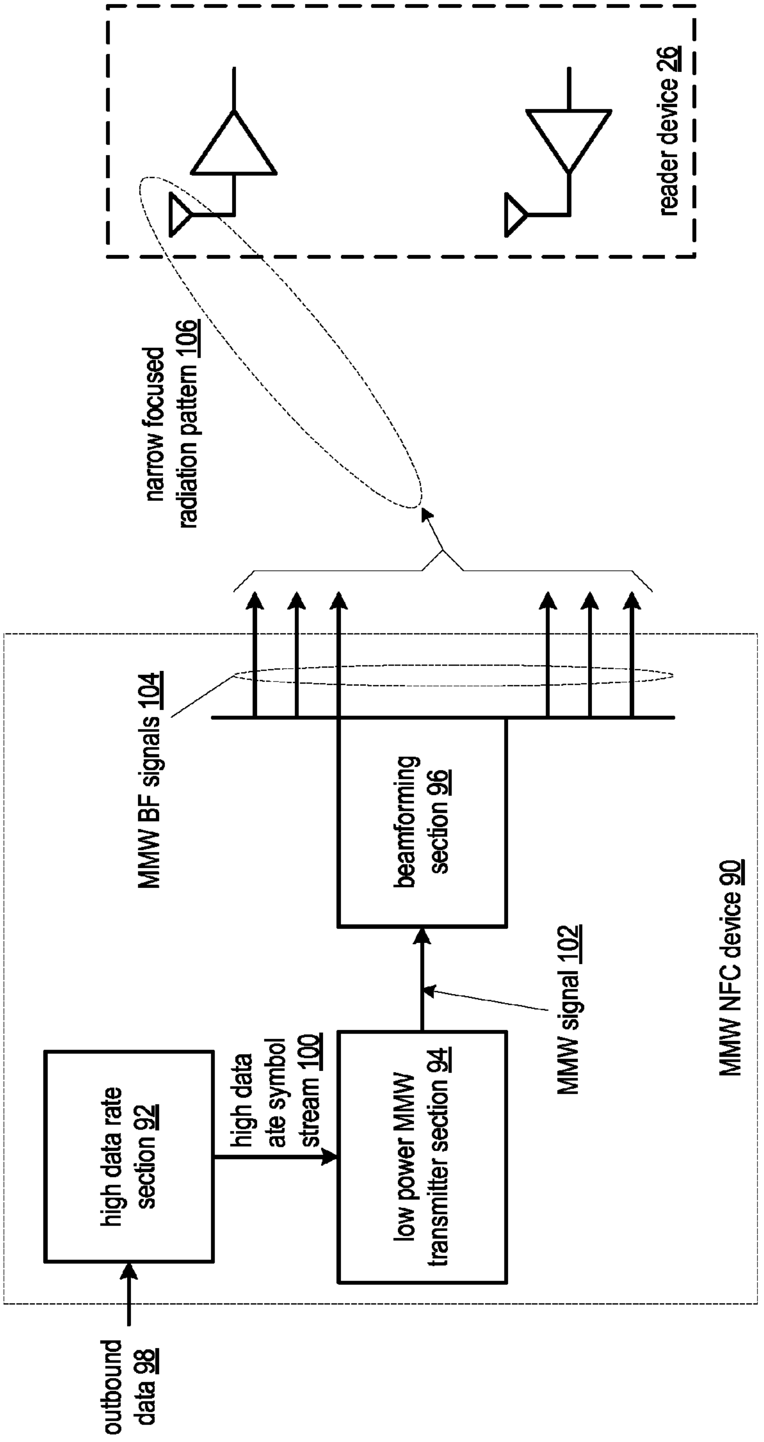
FIG. 9 is a schematic block diagram of another embodiment of a millimeter wave (MMW) near field communication (NFC) device in accordance with the present invention.

FIG. 9 is a schematic block diagram of another embodiment of a millimeter wave (MMW) near field communication (NFC) device 10 that generates a narrow focused radiation pattern 106 to communicate with a reader device 26. The device 10 includes a high data rate section 92, a low power MMW transmitter section 94, and a beamforming section 96.

The high data rate section 92 converts outbound data 98 into a high data rate symbol stream 100. In an embodiment, the high data rate section 92 may include a processing module (e.g., similar to processing module 12) to modulate the outbound data 98, which may be secure data such as credit card information, medical information, personal information, and/or any other information desired to be held in confidence, to produce the high data rate symbol stream 100. The processing module may use any of a plurality of modulation techniques to modulate the data 30. For example, the processing module may be use any form of frequency shift keying (FSK), minimum shift keying (MSK), phase shift keying (PSK) modulator, and/or amplitude shift keying (ASK).

The low power millimeter wave (MMW) transmitter section 94 converts the high data rate symbol stream 100 into a MMW signal 102 having an NFC transmit range (e.g., range of a few centimeters or less). The low power MMW transmitter section 94 may include one or more MMW oscillation modules as described in FIG. 6 or 8.

The beamforming section 96 converts the MMW signal 102 into a plurality of MMW beamformed signals 104 that, when combined in air, produce a narrow focused radiation pattern 106 between the MMW NFC device 90 and a reader device 26. An embodiment of the beamforming section 96 will be described in greater detail with reference to FIG. 10.

Figure 10:
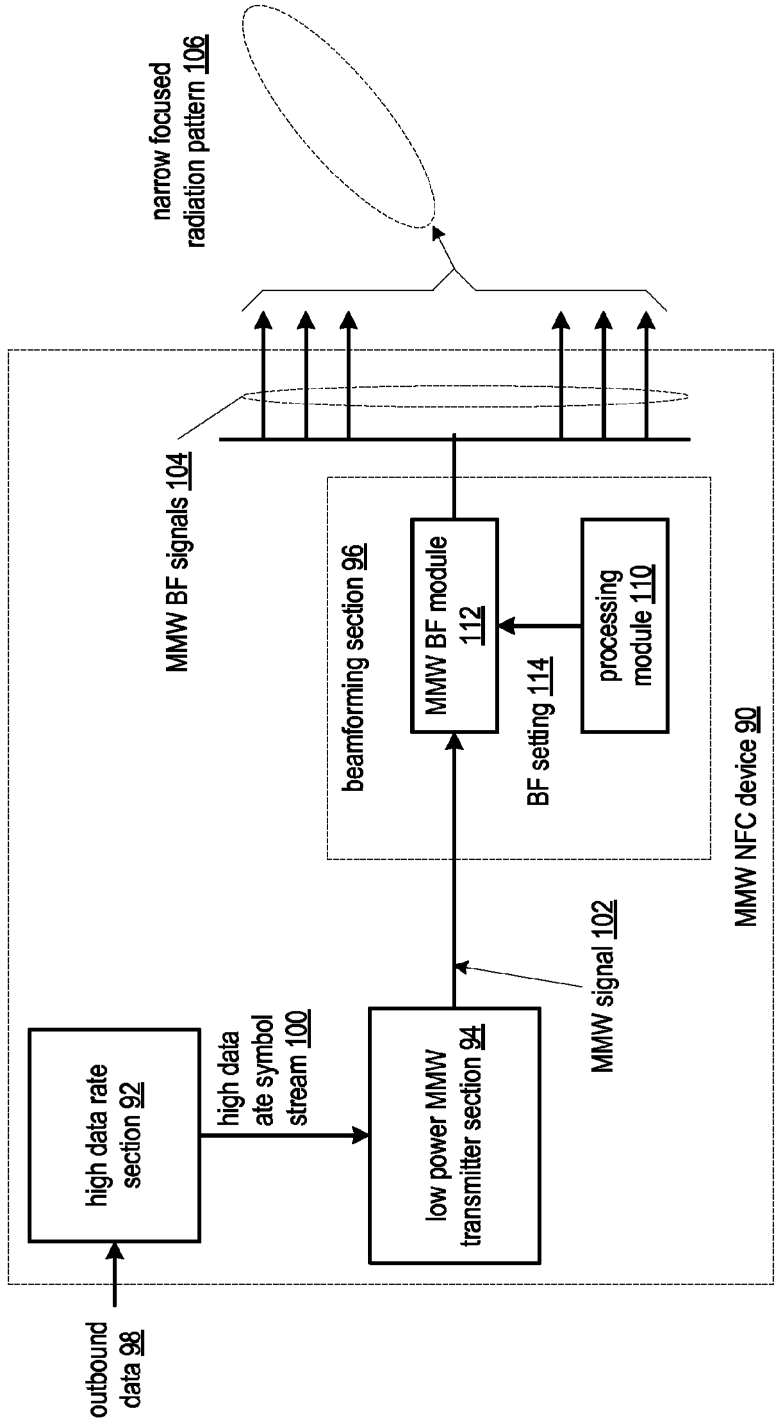
FIG. 10 is a schematic block diagram of another embodiment of a millimeter wave (MMW) near field communication (NFC) device in accordance with the present invention.

FIG. 10 is a schematic block diagram of another embodiment of a millimeter wave (MMW) near field communication (NFC) device 10 that generates a narrow focused radiation pattern 106 to communicate with a reader device 26. The device 10 includes a high data rate section 92, a low power MMW transmitter section 94, and a beamforming section 96. The beamforming section 96 includes a processing module 110 (which may be similar in construct to processing module 12) and a MMW beamforming module 112.

The processing module 110 determines a beamforming setting 114 upon activation of the MMW NFC device. This may be done as previously described. The MMW beamforming module 112 converts the MMW signal 102 into the plurality of MMW beamformed signals 104 based on the beamforming setting 114. In an embodiment, the MMW beamforming module 112 may include the MMW beamforming module 16 and the plurality of amplifiers 20-24 of previous embodiments.

In this embodiment, as in previous embodiments, the processing module 110 (or 12 in previous embodiments) updates the beamform setting 114 as the MMW NFC device 10 moves with respect to the reader device 26. In this manner, as the device 10 is swiped by the reader device 26, the narrow focused radiation pattern 106 is adjusted to maintain a direct and narrow MMW path between the transmitter section of the device 10 and the receiver section of the reader device 26. The updating may be performed on a periodic basis in a similar manner as the initial determination of the beamforming setting 114.

Figure 11:
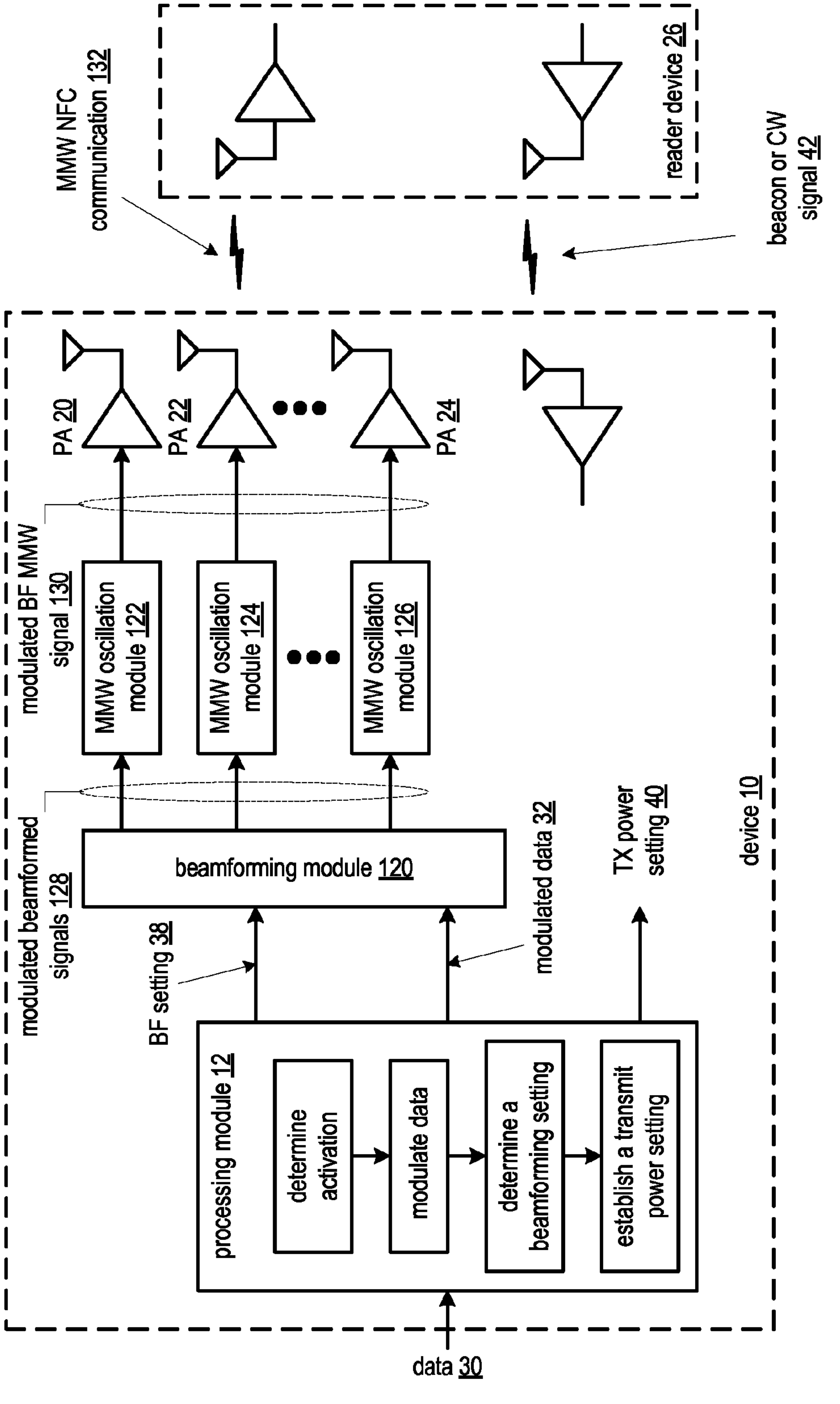
FIG. 11 is a schematic block diagram of another embodiment of a millimeter wave (MMW) near field communication (NFC) device in accordance with the present invention.

FIG. 11 is a schematic block diagram of another embodiment of a millimeter wave (MMW) near field communication (NFC) device 10 providing information to a reader device 26 via an MMW NFC transmission 28. The device 10 includes a processing module 12, a beamforming module 120, a plurality of MMW oscillation modules 122-126, and a plurality of amplifiers 20-24.

In operation, the processing module 12 determines activation of the device 10. This may be done in a variety of ways. For example, the device 10 may receive a beacon signal 42 from the reader device 26, may receive a continuous wave signal 42 from the reader device, and/or may capacitively sense handling of the device and determine motion of the device as previously discussed.

The processing module then modulates data 30 to produce modulated data 32 as previously discussed. The processing module 12 continues by determining a beamforming setting 38, which may be done in a variety of ways as previously discussed. The processing module then establishes a transmit power setting 40, which may be done in a variety of ways as previously discussed.

The beamforming module 120 converts the modulated data 32 into a plurality of modulated beamformed signals 128 based on the beamforming setting 38. An embodiment of the beamforming module 120 will be described in greater detail with reference to FIG. 12. The plurality of MMW oscillation modules 122-126 generate a plurality of modulated beamformed MMW signals 130 based on the plurality of beamformed signals 128. An embodiment of the oscillation modules 122-126 will be described in greater detail with reference to FIG. 12.

The plurality of amplifiers 20-24 amplify the plurality of modulated beamformed MMW signals 130 in accordance with the transmit power setting 40 to produce a MMW near field transmission 132. The resulting near field transmission 132 has a narrow radiation pattern and has a very short range (e.g., less than a few centimeters). With these attributes, the device 10 is very low power and, with the narrow radiation pattern, is well suited for NFC applications.

Figure 12:
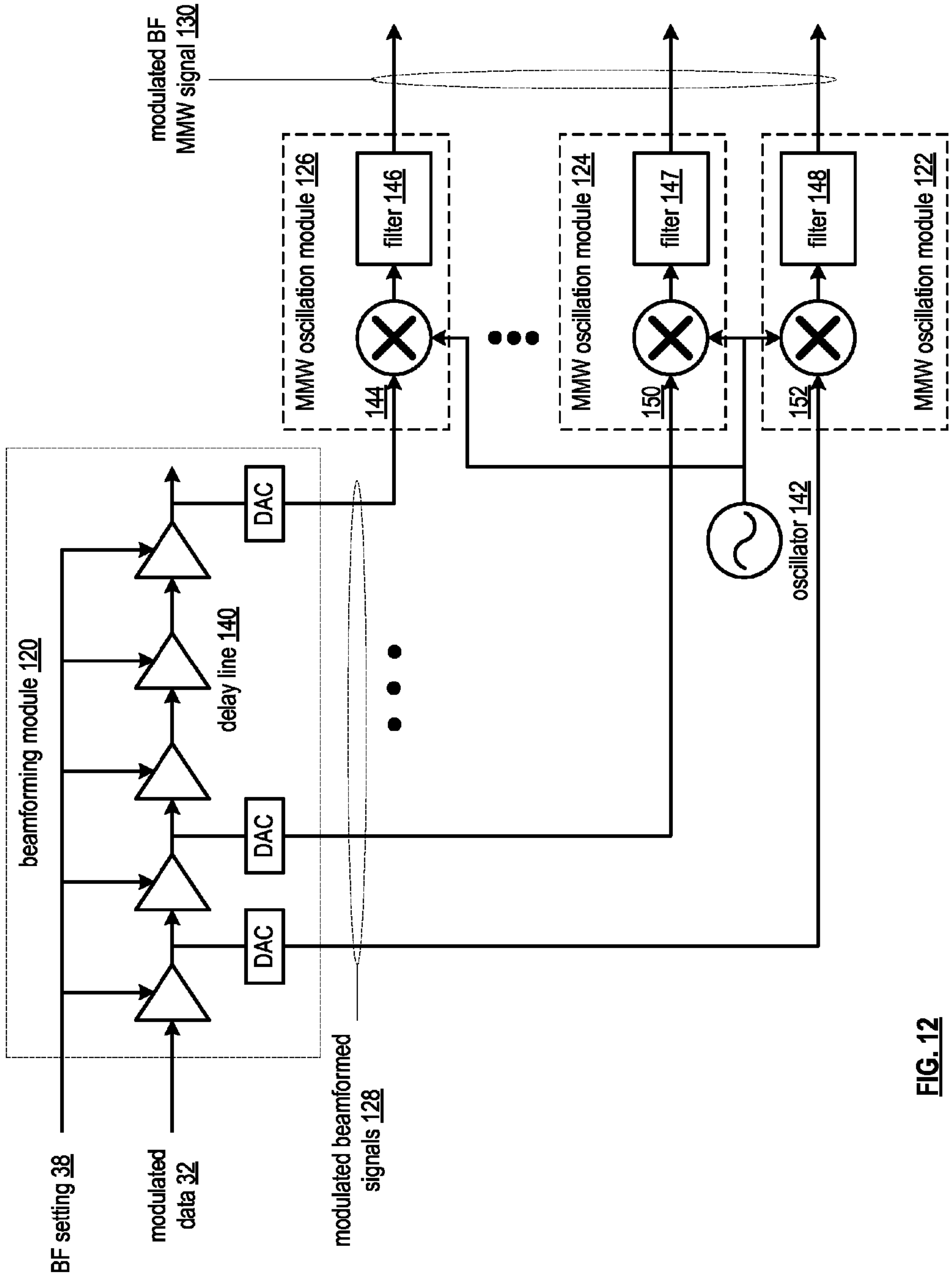
FIG. 12 is a schematic block diagram of another embodiment of millimeter wave (MMW) oscillation modules and a beamforming module in accordance with the present invention.

FIG. 12 is a schematic block diagram of another embodiment of millimeter wave (MMW) oscillation modules 126 and a beamforming module 120. In this embodiment, the beamforming module 120 includes a delay line 140 and a plurality of digital to analog converters (DAC). The delay line 140 converts the modulated data 32 into a plurality of digital modulated beamformed signals based on the beamforming setting 38. Note that these signals are at baseband or near baseband (e.g., carrier frequency of a few MHz). Further note that each delay element of the delay line may have a different beamforming setting (e.g., delay setting) or use the same beamforming setting as another element.

The plurality of digital to analog conversion modules converts the plurality of digital modulated beamformed signals into the plurality of modulated beamformed signals 128. The MMW oscillation modules 122-126 convert the modulated beamformed signals 128 in the modulated BF MMW signals 130. The MMW oscillation modules 122-126 may be voltage controlled oscillators or phase locked loops.

Alternatively, as depicted in the present figure, the MMW oscillation modules 122-126 may each include a mixing module 144, 150, 152, and a filter module 146, 147, 148. The mixing modules 144, 150, and 152 mix their respective modulated beamformed signal 128 with an oscillation produced by oscillator 142. The filters 146-148 remove unwanted signals components, including unwanted side bands, to produce the desired modulated beamformed MMW signals 130.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A device comprises:

a processing module coupled to:

determine activation of the device;

upon determination of activation, modulate data to produce modulated data;

determine a beamforming setting in accordance with the determination of activation; and establish a transmit power setting in accordance with the determination of activation;

a millimeter wave (MMW) oscillation module coupled to generate a modulated MMW signal based on the modulated data, wherein the MMW oscillation module includes a phase locked loop coupled to generate an in-phase oscillation component and a quadrature oscillation component based on a reference oscillation and the modulated data, wherein the modulated MMW signal includes the in-phase oscillation component and the quadrature oscillation component;

a MMW beamforming module coupled to convert the modulated MMW signal into a plurality of MMW beamformed signals based on the beamforming setting, wherein the MMW beamforming module includes a plurality of phase adjust modules, wherein a phase adjust module includes:

a first adjustable gain module coupled to adjust gain of the quadrature oscillation component based on an element of the beamforming setting to produce a first adjusted oscillation;

a second adjustable gain module coupled to adjust gain of the in-phase oscillation component based on the element of the beamforming setting to produce a second adjusted oscillation; and a summing module coupled to sum the first and second adjusted oscillations to produce one of the plurality of MMW beamformed signals; and a plurality of amplifiers coupled to amplify the plurality of MMW beamformed signals in accordance with the transmit power setting to produce a MMW near field transmission.

2. The device of claim 1, wherein the processing module determines the activation by at least one of:

receiving a beacon signal from a reader device;

by receiving a continuous wave signal from the reader device; and capacitively sensing handling of the device and determining motion of the device.

3. The device of claim 1, wherein the processing module determines the beamforming setting by:

determining orientation of the device with respect to a reader device; and establishing the beamforming setting based on the orientation to provide a controlled radiation pattern between the device and the reader device.

4. The device of claim 1, wherein the processing module determines the beamforming setting by:

receiving a beacon signal from a reader device; and establishing the beamforming setting based on the beacon signal to provide a controlled radiation pattern between the device and the reader device.

5. The device of claim 1, wherein the processing module establishes the transmit power setting by:

determining orientation of the device with respect to a reader device; and determining a transmit power level for each of the plurality of amplifiers.

6. A device comprises:

a processing module coupled to:

determine activation of the device;

upon determination of activation, modulate data to produce modulated data;

determine a beamforming setting in accordance with the determination of activation; and establish a transmit power setting in accordance with the determination of activation;

a millimeter wave (MMW) oscillation module coupled to generate a modulated MMW signal based on the modulated data, wherein the MMW oscillation module includes:

a conversion module to convert the modulated data into a modulated control voltage;

a voltage controlled oscillator to generate a differential oscillation based on the modulated control voltage, wherein the differential oscillation includes a non-inverted oscillation component and an inverted oscillation component; and an integrator to integrate one of the non-inverted oscillation component and the inverted oscillation component to produce a quadrature oscillation component, wherein the modulated MMW signal includes the quadrature oscillation component and another one of the non-inverted oscillation component and the inverted oscillation component; and a MMW beamforming module coupled to convert the modulated MMW signal into a plurality of MMW beamformed signals based on the beamforming setting, wherein the MMW beamforming module includes a plurality of phase adjust modules, wherein a phase adjust module includes:

a first adjustable gain module coupled to adjust gain of the quadrature oscillation component based on an element of the beamforming setting to produce a first adjusted oscillation;

a second adjustable gain module coupled to adjust gain of the another one of the non-inverted oscillation component and the inverted oscillation component based on the element of the beamforming setting to produce a second adjusted oscillation; and a summing module coupled to sum the first and second adjusted oscillations to produce one of the plurality of MMW beamformed signals; and a plurality of amplifiers coupled to amplify the plurality of MMW beamformed signals in accordance with the transmit power setting to produce a MMW near field transmission.

7. A millimeter wave (MMW) near field communication (NFC) device comprises:

a high data rate section coupled to convert outbound data into a high data rate symbol stream;

a low power millimeter wave (MMW) transmitter section coupled to convert the high data rate symbol stream into a MMW signal having an NFC transmit range, wherein the MMW transmitter section includes a phase locked loop coupled to generate an in-phase oscillation component and a quadrature oscillation component based on a reference oscillation and the high data rate symbol stream, wherein the MMW signal includes the in-phase oscillation component and the quadrature oscillation component; and a beamforming section coupled to convert the MMW signal into a plurality of MMW beamformed signals that, when combined in air, produce a narrow focused radiation pattern between the MMW NFC device and a reader device, wherein the beamforming section includes a plurality of phase adjust modules, wherein a phase adjust module includes:

a first adjustable gain module coupled to adjust gain of the quadrature oscillation component based on an element of the beamforming setting to produce a first adjusted oscillation;

a second adjustable gain module coupled to adjust gain of the in-phase oscillation component based on the element of the beamforming setting to produce a second adjusted oscillation; and a summing module coupled to sum the first and second adjusted oscillations to produce one of the plurality of MMW beamformed signals.

8. The MMW NFC device of claim 7, wherein the high data rate section comprises one of:

an FSK (frequency shift keying) modulator;

an MSK (minimum shift keying) modulator;

a PSK (phase shift keying) modulator; and an ASK (amplitude shift keying) modulator.

9. The MMW NFC device of claim 7, wherein the beamforming section comprises:

a processing module coupled to determine a beamforming setting upon activation of the MMW NFC device; and a MMW beamforming module coupled to convert the MMW signal into the plurality of MMW beamformed signals based on the beamforming setting.

10. The MMW NFC device of claim 9, wherein the processing module determines the beamforming setting by:

determining orientation of the MMW NFC device with respect to a reader device; and establishing the beamforming setting based on the orientation to provide a controlled radiation pattern between the MMW NFC device and the reader device.

11. The MMW NFC device of claim 9, wherein the processing module determines the beamforming setting by:

receiving a beacon signal from a reader device; and establishing the beamforming setting based on the beacon signal to provide a controlled radiation pattern between the MMW NFC device and the reader device.

12. The MMW NFC device of claim 9, wherein the processing module further functions to:

update the beamform setting as the MMW NFC device moves.

13. A millimeter wave (MMW) near field communication (NFC) device comprises:

a high data rate section coupled to convert outbound data into a high data rate symbol stream;

a low power millimeter wave (MMW) transmitter section coupled to convert the high data rate symbol stream into a MMW signal having an NFC transmit range, wherein the MMW transmitter section module includes:

a conversion module to convert the high data rate symbol stream into a modulated control voltage;

a voltage controlled oscillator to generate a differential oscillation based on the modulated control voltage, wherein the differential oscillation includes a non-inverted oscillation component and an inverted oscillation component; and an integrator to integrate one of the non-inverted oscillation component and the inverted oscillation component to produce a quadrature oscillation component, wherein the MMW signal includes the quadrature oscillation component and another one of the non-inverted oscillation component and the inverted oscillation component; and a beamforming section coupled to convert the MMW signal into a plurality of MMW beamformed signals that, when combined in air, produce a narrow focused radiation pattern between the MMW NFC device and a reader device, wherein the beamforming section includes a plurality of phase adjust modules, wherein a phase adjust module includes:

a first adjustable gain module coupled to adjust gain of the quadrature oscillation component based on an element of the beamforming setting to produce a first adjusted oscillation;

a second adjustable gain module coupled to adjust gain of the another one of the non-inverted oscillation component and the inverted oscillation component based on the element of the beamforming setting to produce a second adjusted oscillation; and a summing module coupled to sum the first and second adjusted oscillations to produce one of the plurality of MMW beamformed signals.

* * * * *